May 31, 1949.                E. E. PARKER                2,471,539
            FIXTURE FOR RELIEF GRINDING OF CUTTING TOOLS
Filed July 21, 1947                                2 Sheets-Sheet 1
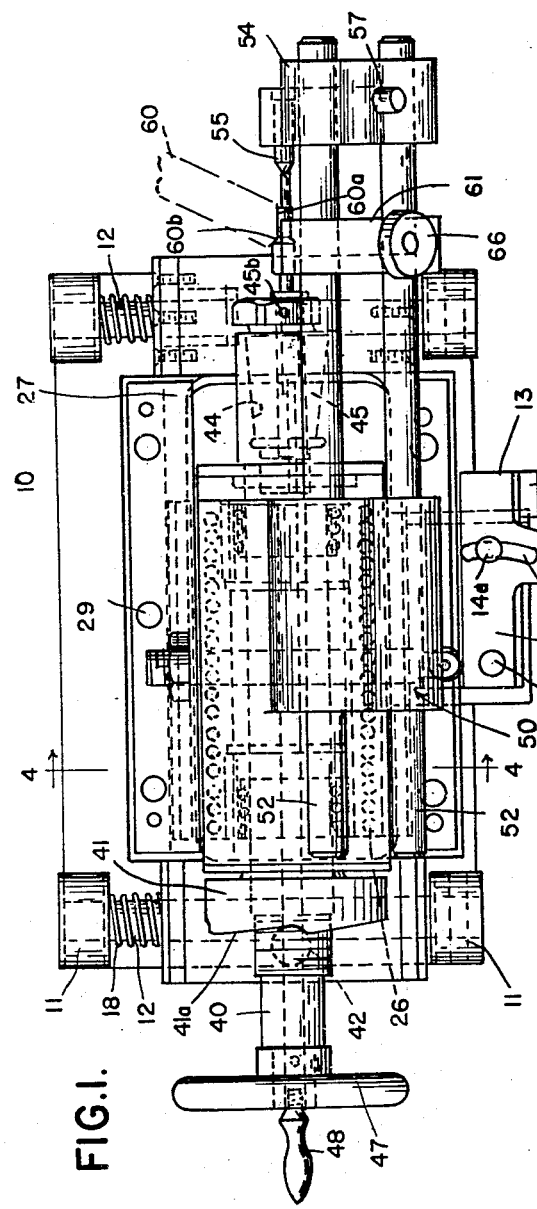
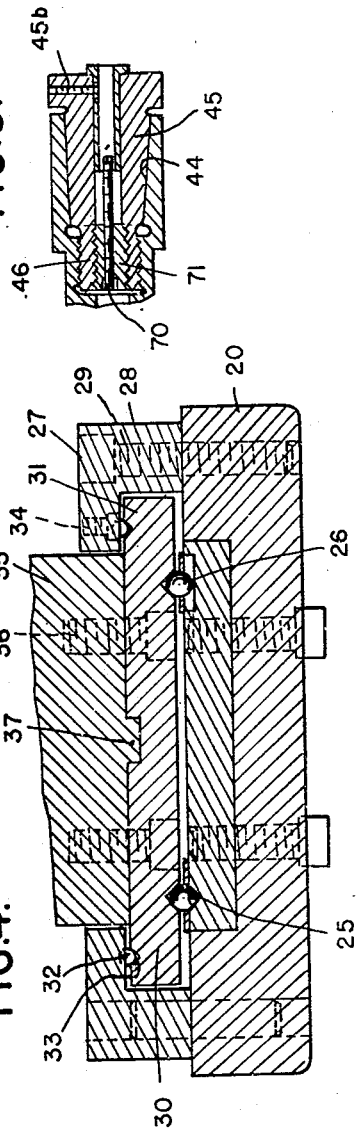
INVENTOR.
EMMETT E. PARKER
BY
ATTORNEYS May 31, 1949.  E. E. PARKER  2,471,539
FIXTURE FOR RELIEF GRINDING OF CUTTING TOOLS
Filed July 21, 1947  2 Sheets-Sheet 2

INVENTOR.
EMMETT E. PARKER
BY
ATTORNEYS

Patented May 31, 1949

2,471,539

UNITED STATES PATENT OFFICE 2,471,539

FIXTURE FOR RELIEF GRINDING OF CUTTING TOOLS

Emmett E. Parker, Farmington, Mich., assignor to Midwest Tool & Manufacturing Company, Detroit, Mich., a corporation of Michigan Application July 21, 1947, Serial No. 762,234

7 Claims. (Cl. 51—232)

The invention relates to apparatus for the relief grinding of cutting tools and it is the object of the invention to obtain a construction of fixture for use in connection with a grinder by which either or both axial and radial relief is ground adjacent to cutting edges of the tool. To this end the invention consists in the construction as hereinafter set forth.

In the drawings:

Fig. 1 is a plan view of the fixture indicating the formed grinder wheel in dotted lines;

Fig. 4 is a section on line 4—4, Fig. 1;

Fig. 5 is a longitudinal central section through the shaft and tool holder;

Generally described my improved fixture comprises a base, a sub-carriage mounted for traveling over said base in one direction, a super-carriage mounted for traveling engagement with said sub-carriage in a direction transverse and perpendicular to the direction of movement of the latter on said base, a work holding rotary shaft mounted on said super-carriage with its axis parallel to the direction of movement of the latter on the sub-carriage and cams for controlling both the longitudinal and transverse movements of said carriages coincident with a rotation of said shaft. The fixture has in addition an adjustable tail center holder which is mounted upon and carried with said super-carriage.

Figure 2:
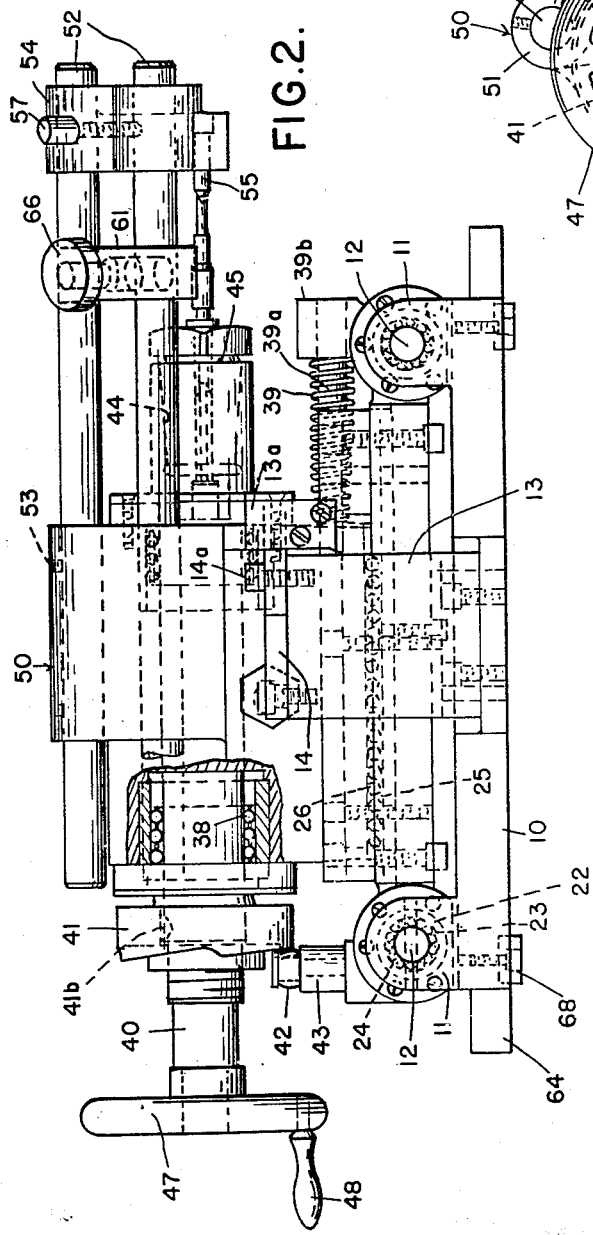
Fig. 2 is a side elevation.
Figure 3:
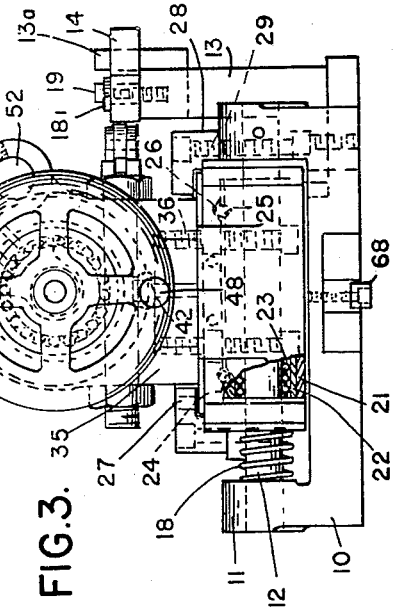
Fig. 3 is an end elevation.
Figure 6:
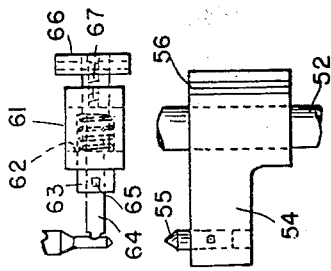
Fig. 6 is an elevation showing a portion of the extension frame, the adjustable tail stock thereon and the tool setting gauge.

More in detail, the base 10 is preferably rectangular in form and has extending upward at the four corners thereof lugs or ears 11 for supporting transversely extending rods 12 which have their axes parallel to each other. At one side of the base and centrally thereof in a longitudinal direction is an upwardly extending bracket or post 13 for the mounting thereon of a cam or sine bar 14. The sub-carriage 20 is also preferably of rectangular form but has at its opposite ends tubular portions 21 which are sleeved about and concentric with the respective rods 12. Anti-friction bearings are provided between the rods and tubular portions comprising annular race members 22 engaging counterbores in the tubular portions 21, ball cages 23 between said race members and rods and balls 24 positioned by said cages to be held in rolling contact with both race members and rods. Thus the construction is one in which the sub-carriage 20 is held to a rectilinear movement parallel to the axes of said rods but with very low frictional resistance. The sub-carriage is further provided on its upper face with longitudinally extending parallel raceways 25 for receiving a series of balls 26 which support a super-carriage 30. The latter has a lower portion 31 the opposite side edges of which are overlapped by flanges 27 of members 28 extending longitudinally of the carriage 20 and secured thereto by clamping bolts 29. Bearings, such as balls 32, engaging longitudinally extending grooves or raceways 33 in the portion 31 and adjustment screws 34 in the overlapping flanges 27, hold the super-carriage against vertical displacement. The carriage 30 has mounted on the lower portion 31 thereof an upwardly extending body member 35 secured by screws 36 and aligned by a key 37 engaging a keyway in the member 31. The member 35 is longitudinally bored to receive a shaft 40, both end portions of which extend beyond said member. Anti-friction bearings such as ball bearings 38 are placed between the shaft and the member 35. The projecting end portion of the shaft 40, which is to the left Figs. 1 and 2, has mounted thereon an exchangeable rotary cam member 41. This is in engagement with a roller 42 mounted on an upward extension 43 of the tubular portion 21 of the sub-carriage 20. The opposite end portion of the shaft 40, to the right Figs. 1 and 2, is provided with a tapered socket 44 for receiving a correspondingly tapered adaptor member 45. The latter has a threaded shank portion 46 at its inner end for engaging corresponding internal threads in the shaft to hold the adaptor rigidly connected to said shaft. The tool to be ground is mounted in the exchangeable adaptor suited therefor so as to also maintain rigid relation to the shaft. However, as the tools are of various constructions, I have not illustrated the same. Where the tool to be ground is of considerable axial length it may be desirable to support its outer end and I have, therefore, provided the following construction.

50 is a radially projecting portion of the member 35 provided with parallel bearings 51 for receiving extension rods 52 secured in various positions of adjustment in said bearings by set screws 53. Adjustably mounted on these rods is a tail stock 54 which carries a center 55 in axial alignment with the tool mounted in the adaptor 45 and forming a supporting bearing for the outer end thereof. The tail stock 54 has a split bearing 56 for engaging one of the rods 52 and a screw 57 clamps the two portions of this bearing to the rod to hold the tail stock from movement.

The exchangeable cam 41, before mentioned, corresponds to the particular tool which is to be relief ground. Thus the edge which is in contact with the roller 42 has a series of inclined portions 41a corresponding in angle about the shaft axis to the portions between flutes in the tool. Thus if the shaft is rotated it will impart a reciprocation to the carriage 30. The movement to the right Figs. 1 and 2 being effected by the cooperation of the cam and roller 42, while the return movement is effected by a spring 39. This is preferably sleeved about a rod 39a secured to a bracket 39b on the carriage 20 which rod engages an aligned bore in the member 35, while the opposite end of the spring abuts against said member. The member 35 has a transverse bore therethrough which is in the horizontal plane of the sine bar 14, before described. Within this bore is a threaded rod 15 which is secured by nuts 16. The end of the rod adjacent to the sine bar is bifurcated to receive a roller 17 which is in contact with the sine bar. There are also springs 18 sleeved on the rods 12 and bearing against the carriage 20 to yieldably press the roller 17 against the sine bar. The sine bar 14 is pivoted at 18' to the post 13 and has near its opposite end an upwardly extending pin 19. There is also an upwardly extending flange 13a on the post 13. This construction permits of setting the sine bar at any desired angle by placing between the flange 13a and the pin 19 a measuring block of the proper dimension after which the sine bar is clamped in position by a screw 14a passing through a segmental slot 14b and engaging a threaded aperture in the post. At the left end of the shaft 40 is detachably mounted a wheel 47 having a handle 48 by means of which the shaft may be rotated. When, however, the cam 41 is exchanged the wheel 47 must be removed to permit the removal of one cam and the engagement of another. The cam 41 has a key engagement with the shaft 40 indicated at 41b.

Operation

My improved fixture is mountable upon any suitable grinder machine (not shown) so that a form grinder wheel 60 (indicated in dotted lines Fig. 1) may be brought into operative relation to the tool to be ground. Assuming that the tool has been engaged with the adaptor 45 and if necessary also with the tail center 55, the grinder wheel is adjusted to bring one face 60a thereof in contact with the cylindrical portion of the tool and another face 60b in contact with a shoulder or step in the tool. The flutes in the tool correspond in number to the cam portions 41a of the cam 41 and after proper seating the tool is clamped in the adaptor by a set screw 45b. The wheel 47 is then rotated by means of the handle 48 which will cause the cam 41 to reciprocate the carriage 30. This in turn will move the roller 17 along the sine bar 14 (which has been previously set at the proper angle) which will cause a transverse movement of the sub-carriage 20 along the rods 12 and against the resistance of the springs 18. This transverse movement will cause the grinder wheel to grind radial relief in the tool, while the axial movement of the carriage will grind axial relief in the step shoulder of the tool.

To facilitate the setting of the tool so that the flutes or grooves therein will be in proper angular relation to the portions 41a of the cam, I preferably provide a gauge 61. This has a portion 62, which is slideably mounted on the rods 52, and a spring pressed plunger 63 engaging a bore in the member 62 projects radially inward toward the axis of the shaft. An adaptor member 64, having its end fashioned to suit the particular tool which is to be positioned, is detachably connected to the member 63 by a set screw 65. The plunger 64 projects outward beyond the member 62 having a head 66 thereon by means of which it may be withdrawn in opposition to the tension of the spring. An adjusting screw 67 threadedly engaging the head 66 is inserted in a socket in the member 62 and by adjusting this screw the inward movement of the plunger may be variably limited. Thus to set the tool the proper adaptor member 64 is secured to the plunger 63 and the screw 67 is adjusted so that the fixed end of this adaptor will properly engage the flute or groove in the tool. Therefore the tool may be set in proper angular relationship to the cam by moving this gauge member into position for engaging a flute in the tool and then clamping the tool in this position after which the gauge may be withdrawn.

To facilitate the placing of the base 10 in the proper position on the table of the grinding machine it is preferably provided with downwardly projecting lugs 68 engageable with a channel in the table. Projecting lugs 69 at the opposite ends of the base may be used for engagement of clamps (not shown) which rigidly secure the base to the table. It is to be understood that the grinder wheel 60 is mounted in the grinding machine so as to be movable into proper relation to the tool to be ground and that this wheel is prefashioned to the proper contour for grinding the axially extending portions and the steps in the tool. To position the tool longitudinally with respect to the adaptor 45 the latter may be provided with a stop. This, as shown, consists of an adjusting screw 70 engaging a threaded aperture in a plug 71 which in turn is engaged with an internal threaded portion of the shank 46 of the member 45. The screw 70 may be adjusted to position its outer end to form a stop for the shank of the tool which is engaged with the adaptor and thus will position said tool longitudinally.

What I claim as my invention is:

1. A fixture for the relief grinding of cutting tools comprising a base adapted for mounting on a grinding machine in operative relation to the grinder thereof, a sub-carriage mounted on said base for rectilinear movement thereover in one direction thereof, a super-carriage mounted on said sub-carriage for rectilinear movement thereon in a direction perpendicular to the aforesaid movement, a shaft rotatably mounted on said super-carriage with its axis parallel to the direction of movement of one of said carriages, said shaft being provided with an axially arranged tool holder at one end thereof, an exchangeable cam mounted on said shaft and a cooperating bearing whereby the rotation of said shaft will move the same and one of said carriages in one of the said directions, a second cam operated by the movement of said carriage for simultaneously moving the other carriage and shaft in the other of said directions thereby moving said tool axially and radially thereof with respect to the grinder.

2. A fixture for the relief grinding of cutting tools comprising a base adapted for mounting on a grinder machine in operative relation to the grinder thereof, spaced parallel rods mounted on said base, a sub-carriage having tubular end portions sleeved about said rods, ball bearings between said tubular portions and their rods, a super-carriage having a ball bearing engagement with said sub-carriage for rectilinear movement thereover in a direction perpendicular to the axes of said rods, a shaft journaled on said super-carriage with its axis parallel to the direction of movement thereof relative to said sub-carriage, an axially arranged tool holder at one end of said shaft, an exchangeable cam mounted on said shaft, a cooperating bearing for said cam in fixed relation to said sub-carriage whereby the rotation of said shaft and cam will actuate said shaft and super-carriage in an axial direction of said shaft, and a cam and bearing therefore, the one on said base and the other on said super-carriage for moving said shaft in the direction transverse to its axis thereby moving said tool simultaneously axially and radially thereof in relation to said grinder.

3. A fixture for relief grinding of cutting tools comprising a base adapted for mounting on a grinding machine in operative relation to the grinder thereof, a sub-carriage mounted on said base for rectilinear movement thereof in one direction, a super-carriage mounted on said sub-carriage for rectilinear movement in a direction perpendicular to the aforesaid movement, a shaft rotatably mounted on said super-carriage with its axis parallel to the direction of movement of one of said carriages, said shaft being provided with an axially arranged tool holder at one end thereof, an exchangeable cam mounted on said shaft and a cooperating bearing whereby the rotation of said shaft will move the same and one of said carriages in one of said directions, a roller on said super-carriage and a sine bar mounted on said base in operative relation to said roller whereby the movement of said super-carriage and roller in cooperation with said sine bar will move said shaft in the other of said directions thereby simultaneously moving said tool axially and radially in relation to said grinder.

4. A fixture for relief grinding of tools comprising a base adapted for mounting on a grinder machine in operative relation to the grinder thereof, a sub-carriage mounted on said base for rectilinear movement thereof in one direction, a super-carriage mounted on said sub-carriage for rectilinear movement thereon in a direction perpendicular to the aforesaid movement, a shaft rotatably mounted on said super-carriage with its axis parallel to the direction of movement of one of said carriages, said shaft being provided with an axially arranged tool holder at one end thereof, an exchangeable cam mounted on said shaft and a cooperating bearing whereby the rotation of said shaft will move the same and one of said carriages in one of said directions, a second cam operated by the movement of said carriage for simultaneously moving the other carriage and shaft in the other of said directions, a frame mounted on said super-carriage to extend therebeyond parallel to the axis of said shaft, a tail-stock adjustably mounted on said extension frame and carrying a center axially aligned with said shaft for engaging and supporting the outer end of the tool.

5. A fixture for relief grinding of tools comprising a base adapted for mounting on a grinder machine in operative relation to the grinder thereof, a sub-carriage mounted on said base for rectilinear movement thereof in one direction, a super-carriage mounted on said sub-carriage for rectilinear movement thereon in a direction perpendicular to the aforesaid movement, a shaft rotatably mounted on said super-carriage with its axis parallel to the direction of movement of one of said carriages, said shaft being provided with an axially arranged tool holder at one end thereof, an exchangeable cam mounted on said shaft and a cooperating bearing whereby the rotation of said shaft will move the same and one of said carriages in one of said directions, a second cam operated by the movement of said carriage for simultaneously moving the other carriage and shaft in the other of said directions, a frame mounted on said super-carriage to extend therebeyond parallel to the axis of said shaft, a tail stock adjustably mounted on said extension frame carrying a center axially aligned with said shaft for engaging and supporting the outer end of the tool and a gauge member adjustably mounted on said extension frame and directed towards the axis of said shaft being adapted to engage the tool for positioning the same angularly with respect to one of said cams.

6. A fixture for relief grinding of tools comprising a base adapted for mounting on a grinder machine in operative relation to the grinder thereof, a sub-carriage mounted on said base for rectilinear movement thereof in one direction, a super-carriage mounted on said sub-carriage for rectilinear movement thereon in a direction perpendicular to the aforesaid movement, a shaft rotatably mounted on said super-carriage with its axis parallel to the direction of movement of one of said carriages, said shaft being provided with an axially arranged tool holder at one end thereof, an exchangeable cam mounted on said shaft and a cooperating bearing whereby the rotation of said shaft will move the same and one of said carriages in one of said directions, a second cam operated by the movement of said carriage for simultaneously moving the other carriage and shaft in the other of said directions, a pair of rods mounted on said super-carriage and extending beyond the same parallel to the axis of said shaft, a tail stock adjustably mounted on said extension rods and carrying a center in axial alignment with said shaft for supporting the outer end of the tube and a gauge also adjustably mounted on said rods and directed towards the axis of said shaft for seating said tool angularly with respect to one of said cams.

7. A fixture for relief grinding of cutting tools comprising a base adapted for mounting on a grinding machine in operative relation to the grinder thereof, a sub-carriage mounted on said base for rectilinear movement thereover in one direction thereof, a super-carriage mounted on said sub-carriage for rectilinear movement thereon in a direction perpendicular to the aforesaid movement, a shaft rotatably mounted on said super-carriage with its axis parallel to the direction of movement of one of said carriages, said shaft being provided with an axially arranged tool holder at one end thereof, a pair of cams and a cooperating bearing for each cam, one of said cams being mounted on said shaft and its cooperating bearing on said sub-carriage, and the other of said cams and its cooperating bearing being mounted the one on the super-carriage and the other on said base, whereby the rotation of said shaft will simultaneously move said tool axially and radially through a predetermined path with respect to said grinder.

EMMETT E. PARKER.

REFERENCES CITED

The following references are of record in the file of this patent:

UNITED STATES PATENTS

| Number | Name | Date |
| --- | --- | --- |
| 900,664 | Clark | Oct. 6, 1908 |
| 2,099,724 | Cogsdill | Nov. 23, 1937 |